US008093329B2

(12) United States Patent
Seneker et al.

(10) Patent No.: US 8,093,329 B2
(45) Date of Patent: Jan. 10, 2012

(54) FLUOROCARBON POLYMER COMPOSITIONS CAPABLE OF PRODUCING LOW GLOSS COATINGS AND METHODS OF COATING COILS THEREWITH

(75) Inventors: Carl A. Seneker, Freeport, PA (US); Hongying Zhou, Allison Park, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 51 days.

(21) Appl. No.: 12/178,942

(22) Filed: Jul. 24, 2008

(65) Prior Publication Data

US 2009/0258990 A1 Oct. 15, 2009

Related U.S. Application Data

(63) Continuation-in-part of application No. 12/101,481, filed on Apr. 11, 2008.

(51) Int. Cl.
*C08L 33/00* (2006.01)
(52) U.S. Cl. .......... 524/521; 524/462; 524/520
(58) Field of Classification Search ............... 524/462, 524/520, 521
See application file for complete search history.

(56) References Cited

U.S. PATENT DOCUMENTS

| | | | | |
|---|---|---|---|---|
| 3,290,416 A * | 12/1966 | Halcoussis et al. | | 428/416 |
| 4,314,004 A | 2/1982 | Stoneberg | | 428/421 |
| 4,480,346 A * | 11/1984 | Hawkins et al. | | 5/490 |
| 4,659,768 A | 4/1987 | Tortorello et al. | | 524/512 |
| 4,680,346 A * | 7/1987 | Carson et al. | | 525/486 |
| 4,824,728 A | 4/1989 | Parsons et al. | | 428/421 |
| 5,041,287 A | 8/1991 | Driggers et al. | | 424/81 |
| 5,102,961 A * | 4/1992 | Blank | | 525/528 |
| 5,130,201 A | 7/1992 | Yoshimura et al. | | 428/416 |
| 5,281,444 A | 1/1994 | Hunt | | 427/428 |
| 6,017,639 A * | 1/2000 | Higginbotham et al. | | 428/458 |
| 6,255,398 B1 | 7/2001 | Zupancic et al. | | 525/199 |
| 6,517,940 B1 | 2/2003 | Millero et al. | | 428/411.1 |
| 6,699,933 B2 * | 3/2004 | Nguyen et al. | | 525/191 |
| 2003/0069348 A1 * | 4/2003 | Nguyen et al. | | 524/520 |

FOREIGN PATENT DOCUMENTS

| | | |
|---|---|---|
| EP | 1069141 A1 | 1/2001 |
| JP | 11077920 | 3/1999 |
| WO | WO 98/17723 | 4/1998 |
| WO | WO 2008/002747 A1 | 1/2008 |

* cited by examiner

*Primary Examiner* — Michael M Bernshteyn
(74) *Attorney, Agent, or Firm* — Donald R. Palladino

(57) ABSTRACT

Disclosed are coating compositions based on non-aqueous dispersions of solid fluoropolymer particles in an organic solution of acrylic polymers. The coating compositions include: (1) a fluorocarbon polymer; (2) an organic solvent; and (3) an adjuvant polymer.

15 Claims, No Drawings

FLUOROCARBON POLYMER COMPOSITIONS CAPABLE OF PRODUCING LOW GLOSS COATINGS AND METHODS OF COATING COILS THEREWITH

CROSS-REFERENCE TO RELATED APPLICATIONS

This application is a continuation-in-part of U.S. patent application Ser. No. 12/101,481, entitled, "Fluorocarbon Polymer Compositions and Methods of Coating Coils Therewith", which was filed Apr. 11, 2008, incorporated herein by reference.

FIELD OF THE INVENTION

The present invention relates to coating compositions based on non-aqueous dispersions of solid fluoropolymer particles in an organic solution which are capable of producing low gloss coatings.

BACKGROUND INFORMATION

Fluoropolymer dispersion coatings are known to exhibit outdoor durability, chemical resistance, and acceptable mechanical properties. The performance features of fluoropolymer dispersion coatings have led to their extensive use, for example, in the exterior building panel market. Fluoropolymer dispersion coatings are often applied by spray and roll coating or coil coating of flat sheet stock techniques. The coating film is formed by thermal fusion of the fluoropolymer particles in admixture with an acrylic resin.

Historically, fluoropolymer dispersion coatings exhibit a relatively high viscosity at relatively low volume solids content. Consequently, as much as 65 percent organic solvent by volume may be required to reduce the viscosity in order to facilitate application of the fluoropolymer dispersion coatings to a substrate.

The high level of volatile organic compounds (VOCs) of fluoropolymer dispersion coatings generally requires that the solvent vapors emitted by the wet film be captured and conveyed to a gas-fired incinerator or thermal oxidizer to destroy the VOCs. For example, the large amount of VOCs produced by coil coating flat metal sheet stock can limit the line speed of the coating application, or result in blistering of the film at higher film thicknesses. The incineration of the VOCs can also produce higher amounts of nitrogen oxide pollutants, particularly for fossil fuel-fired combustion processes.

As a result, it is desired to provide higher solids, lower VOC content liquid fluoropolymer coating compositions, which would allow for higher line speed application, reduced blistering tendency of the applied coating, and/or a reduced impact on the environment from VOCs. Furthermore, it would be considered by those skilled in the art to be an advance if such a coating composition could be achieved by the blending of relatively few ingredients while providing a simple formulation that would be easily manufactured and readily reproducible. Moreover, it would be advantageous to provide such coating compositions that include an acrylic polymer that does not cause yellowing and is derived from relatively inexpensive acrylic monomers.

SUMMARY OF THE INVENTION

In certain respects, the present invention is directed to coating compositions comprising: (1) a fluorocarbon polymer; (2) an organic solvent; (3) an adjuvant polymer comprising at least one of: (a) a base neutralized acid functional acrylic polymer; and (b) an acrylic polymer comprising imine-reacted acidic groups; and (4) a base neutralized acidic flatting agent. In these coating compositions, the fluorocarbon polymer (1) is present as a dispersed phase and a solution comprising the organic solvent (2) and the adjuvant polymer (3) is present as a continuous phase.

In other respects, the present invention is directed to coating compositions comprising: (1) a fluorocarbon polymer; (2) an organic solvent; (3) a thermosetting adjuvant polymer comprising reactive functional groups and comprising at least one of: (a) a base neutralized acid functional acrylic polymer; and (b) an acrylic polymer comprising imine-reacted acidic groups; (4) a curing agent having functional groups reactive with the functional groups of the adjuvant polymer; and (5) a base neutralized acidic flatting agent. In these coating compositions, the fluorocarbon polymer (1) is present as a dispersed phase and a solution comprising the organic solvent (2), the adjuvant polymer (3), and the curing agent (4) is present as a continuous phase.

In yet other respects, the present invention is directed to coating compositions comprising: (1) a fluorocarbon polymer; (2) an organic solvent; (3) a thermosetting adjuvant polymer comprising reactive functional groups; (4) a curing agent having functional groups reactive with the functional groups of the adjuvant polymer; (5) a cure catalyst comprising a polymeric isocyanate modified epoxy blocked sulfonic acid ester; and (6) a base neutralized acidic flatting agent.

The present invention is also related to, inter alia, substrates at least partially coated with such compositions and methods for coating a substrate using such compositions, such as methods of coating a metal coil using such compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Certain embodiments of the present invention are directed to coating compositions. Moreover, in certain embodiments, the present invention is directed to solvent-borne coating compositions. As used herein, the term "solvent-borne coating composition" refers to a composition that utilizes one or more volatile organic materials as the primary dispersing medium. Thus, the dispersing medium either consists exclusively of volatile organic material(s) or comprises predominantly, i.e., >50%, volatile organic material(s) in combination with another material, such as, for example, water.

In certain embodiments, however, the amount of water present in the coating compositions of the present invention is less than 10 weight percent, such as less than 5 weight percent, or, in some cases, less than 2 weight percent, or, in yet other cases, less than 1 weight percent, with the weight percents being based on the total weight of the coating composition. Further, certain coating compositions of the present invention are substantially free of water, or, in some cases, completely free of water. As used herein, the term "substantially free" means that the material being discussed is present in the composition, if at all, as an incidental impurity. In other words, the material does not affect the properties of the composition. As used herein, the term "completely free" means that the material being discussed is not present in the composition at all.

In certain embodiments, the coating compositions of the present invention are "exterior-durable" compositions. As used herein, the term "exterior-durable" refers to compositions that form a coating layer which is resistant to crazing, chalking, color change and other manifestations of coating deterioration upon exposure to ultraviolet radiation, weathering and aggressive environments such as those encountered with high levels of industrial pollutants or marine environments.

As previously indicated, the coating compositions of the present invention comprise a fluorocarbon polymer. The fluorocarbon polymer present in the coating compositions of the present invention may be any suitable fluorocarbon polymer for such coating compositions. Examples of suitable fluoropolymers include polyvinyl fluorides, poly(vinylidene fluorides), vinylidene copolymers, and vinylidene fluorides.

Examples of suitable copolymers include those having at least 75 percent by weight, such as 90 percent by weight or more, of vinyl or vinylidene fluoride units. Examples of suitable co-monomers to be copolymerized with the vinyl or vinylidene fluoride include ethylene, propylene, isobutylene, styrene, vinyl chloride, vinylidene chloride, difluorochloroethylene, tetrafluoromethylene, trifluorochloroethylene, hexafluoropropylene, vinyl formate, vinyl acetate, vinyl propionate, vinyl butyrate, acrylic acid and its salts, methyl (meth)acrylate, allyl (meth)acrylate, acrylonitrile, methacrylonitrile, N-butoxymethylacrylamide, allyl acetate and isopropenyl acetate. (As used herein, "(meth)acrylic" and like terms are intended to include both acrylic and methacrylic.) These fluoropolymers are described in detail in U.S. Pat. Nos. 2,419,010; 2,510,783; 2,435,537; 2,935,818; 2,468,054; and 2,970,988.

In certain embodiments, the fluorocarbon polymer has a weight average molecular weight of from 100,000 to 500,000 as determined by gel permeation chromatography using polystyrene standards.

In certain embodiments of the present invention, the fluorocarbon polymer is in the form of solid dispersible particles. The particle size of the dispersible fluorocarbon polymer particles may be, in certain embodiments, from 0.1 to 5.0 microns, such as from 0.2 to 4.0 microns, or, in some cases, from 0.5 to 3.5 microns.

Suitable fluorocarbon polymers are available commercially and include, for example, those fluorocarbon polymers sold under the trade name KYNAR® by Atofina Chemicals, Inc., Philadelphia, Pa. and those fluorocarbon polymers sold under the trade name Hylar® PVDF by Ausimont, an affiliate of the Montedison group, Milan, Italy.

In certain embodiments, the fluorocarbon polymer is present in the coating composition in an amount of at least 30 percent by weight, such as at least 40 percent by weight, or, in some cases, at least 50 percent by weight, in yet other cases at least 60 percent by weight, in still other cases at least 65 percent by weight and, in some cases, at least 70 percent by weight, based on the total weight of resin solids in the coating composition. In certain embodiments, the fluorocarbon polymer is present in the coating composition in an amount of no more than 95 percent by weight, such as no more than 90 percent by weight, or, in some cases, no more than 85 percent by weight, in yet other cases no more than 80 percent by weight, in still other cases no more than 75 percent by weight, based on the total weight of resin solids in the coating composition. The resin solids include, but are not necessarily limited to, the adjuvant polymer(s) described below and the fluorocarbon polymer.

As previously indicated, the coating compositions of the present invention also comprise an organic solvent. Any suitable solvent may be used, so long as it is able to form a solution with the adjuvant polymer(s) described below. The solution should be capable of providing a suitable continuous phase for the fluoropolymer coating composition. Suitable solvents include, but are not limited to, aliphatic hydrocarbons, aromatic hydrocarbons, ketones, heterocyclics, esters, glycols, ethers, ether-esters, glycol ethers, glycol ether-esters, alcohols, ether-alcohols, phthalate plasticizers, and suitable mixtures thereof. Phthalate plasticizers include phthalates esters such as di-ethylhexyl phthalate, di-isononyl phthalate, diisodecyl phthalate, and dioctyl phthalate.

In certain embodiments, the organic solvent is present in an amount of at least 20 percent by weight, such as at least 25 percent by weight, or, in some cases at least 35 percent by weight, based on the total weight of the coating composition. In certain embodiments, the organic solvent is present in an amount of no more than 50 percent by weight, such as no more than 45 percent by weight, or, in some cases, no more than 35 percent by weight, based on the total weight of the coating composition.

Certain embodiments of the coating compositions of the present invention comprise an adjuvant polymer that comprises at least one of: (a) a base neutralized acid functional acrylic polymer; and (b) an acrylic polymer comprising imine-reacted acidic groups. Indeed, it was surprisingly discovered that the inclusion of at least one of these particular adjuvant polymers can, in at least some cases, provide for improved fluorocarbon dispersions and pigment dispersions, even at the high fluorocarbon resin loadings contemplated by certain embodiments of the present invention. These dispersions contain minimum large particles and have good Hegman grind values, often at least 5.

In addition, these dispersions can exhibit favorable rheology properties as defined by a thixotropy index, which is the viscosity of the dispersion in centipoise at 0.5 rpm divided by the viscosity of the dispersion in centipoise at 50 rpm, measured using a Brookfield cone and plate viscometer, 52 spindle, at 25° C. In certain embodiments, the fluorocarbon polymer dispersions comprising at least one of the aforementioned adjuvant polymers exhibit a viscosity index of no more than 9, in some cases no more than 7, and, in yet other cases, no more than 6 or, in yet other cases, no more than 5.

As indicated, in certain embodiments, the adjuvant polymer comprises an acid functional acrylic polymer, wherein the acid functionality is base neutralized. Typically, such an acrylic polymer is prepared from polymerizable ethylenically unsaturated monomers by solution polymerization techniques, which are well known to those skilled in the art, in the presence of suitable catalysts such as organic peroxides or azo compounds, for example, benzoyl peroxide or N,N-azobis (isobutyronitrile). The polymerization often is carried out in an organic solution in which the monomers are soluble by techniques conventional in the art. The ratio of reactants and reaction conditions are selected to result in an acrylic polymer with the desired properties.

Non-limiting examples of suitable ethylenically unsaturated monomers used to prepare the acrylic polymers employed in the coating compositions of the present invention include carboxylic acid functional group-containing monomers such as (meth)acrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof. Non-limiting examples of other ethylenically unsaturated monomers include vinyl monomers such as alkyl esters of acrylic and methacrylic acids, for example, ethyl (meth)acrylate, methyl (meth)acrylate, butyl (meth)acrylate, 2-ethylhexyl (meth)acrylate, isobornyl (meth)acrylate and lauryl (meth)acrylate; vinyl aromatics such as styrene and vinyl toluene; acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

In certain embodiments, the carboxylic acid functional group-containing monomer is present in an amount of 0.1 to 10 percent by weight, such as 1 to 5 percent by weight, or in some cases, more than 2 to 5 percent by weight, or, in yet other cases, more than 2 to 3 percent by weight, based on the total weight of the monomers used to prepare the acrylic polymer.

In certain embodiments, the adjuvant acrylic polymer comprises a thermosetting acrylic polymer of relatively low molecular weight that has reactive functional groups. In certain embodiments, the thermosetting acrylic polymer has a weight average molecular weight ranging from 5000 to 50,000, such as 10,000 to 30,000, or, in some cases, 10,000 to 20,000. Such thermosetting acrylic polymers are the polymerization reaction products of the above-described ethylenically unsaturated monomers and a reactive functional group-containing ethylenically unsaturated monomer.

The reactive functional group-containing polymers can include the polymerization reaction products of self-reactive functional group-containing monomers, such as N-butoxy methylacrylamide, which contain functional groups capable of self-condensing. Other useful reactive functional group-containing ethylenically unsaturated monomers include hydroxyl functional monomers, such as hydroxy ethyl (meth) acrylate, hydroxy propyl (meth)acrylate, 4-hydroxyl butyl (meth)acrylate, and 2-ethylhexyl (meth)acrylate, epoxy functional monomers, such as glycidyl (meth)acrylate and allyl glycidyl ether, and carboxylic acid functional monomers, such as those described earlier.

As indicated, in certain embodiments, the adjuvant acrylic polymer comprises a base neutralized acid functional acrylic polymer. As used herein, by "base neutralized" is meant that at least a portion of the acid functional groups of the acrylic polymer have been neutralized with a base to form a carboxylate salt group. In certain embodiments, the degree of neutralization is at least 0.2, such as 0.2 to 2.0, in some cases from 0.5 to 1.5, such as 0.8 to 1.2, of the total theoretical neutralization equivalent. Suitable neutralizing agents include inorganic and organic bases such as sodium hydroxide, potassium hydroxide, ammonia, amines, alcohol amines having at least one primary, secondary, or tertiary amino group and at least one hydroxyl group. Suitable amines include alkanolamines such as monoethanolamine, diethanolamine, dimethylaminoethanol, diisopropanolamine, and the like, as well as alkylamines, such as dibutylamine, triethylamine, and the like.

The base neutralized acid functional acrylic polymer is not in the form of an aqueous emulsion of the acrylic polymer.

In addition to or in lieu of the foregoing base neutralized acid functional acrylic polymer, certain embodiments of the coating compositions of the present invention comprise an acrylic polymer comprising imine-reacted acidic groups. The imine-modified acidic groups may be provided by any means known to those skilled in the art, including those described in U.S. Pat. No. 3,290,416, incorporated herein by reference.

In particular, in certain embodiments, the imine-modified acid units are provided by first preparing an acid functional acrylic polymer as described above and then reacting the acidic units on such a polymer with an imine. Various alkylenimines and substituted alkylenimines can be used to modify the acidic groups. These correspond generally to the formula:

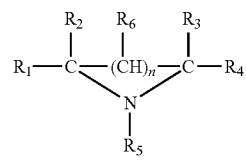

where $R_1$, $R_2$, $R_3$, $R^4$ and $R_5$ are the same or different and each is either hydrogen; alkyl, such as methyl, ethyl, propyl, or the like, having, for example, up to 20 carbon atoms; aryl, such as phenyl or the like; alkaryl, such as tolyl, xylyl or the like; or aralkyl, such as benzyl, phenethyl or the like. $R_6$ in the above formula is hydrogen or a lower alkyl radical usually having not more than about 6 carbon atoms, and n is 0 or 1.

It is intended that the groups designated by the above formula include substituted groups of the classes indicated, including substituents such as cyano, halo, amino, hydroxy, alkoxy, carbalkoxy, and nitrile. The substituted groups may thus be cyanoalkyl, haloalkyl, aminoalkyl, hydroxyalkyl, alkoxyalkyl, carbalkoxyalkyl, and similar substituted derivatives of aryl, alkaryl and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, one and usually several of the groups designated by $R_1$ through $R_6$ will represent hydrogen.

Specific non-limiting examples of materials that fall within the scope of the formula set forth above, and which are suitable for use in the present invention, include: ethylenimine (aziridine); 1,2-propylenimine (2-methyl aziridine); 1,3-propylenimine (azetidine); 1,2-dodecylenimine (2-decyl aziridine); 1,1-dimethyl ethylenimine (2,2-dimethyl aziridine); phenyl ethylenimine (2-phenyl aziridine); tolyl ethylenimine (2-(4-methylphenyl)aziridine); benzyl ethylenimine (2-phenylmethyl aziridine); 1,2-diphenyl ethylenimine (2,3-diphenyl aziridine); hydroxyethyl ethylenimine (2-(2-hydroxyethyl)aziridine); aminoethyl ethylenimine (2-(2-aminoethyl) aziridine); 2-methyl propylenimine (3-methyl azetidine); 3-chloropropyl ethylenimine (2-(3-chloropropyl)aziridine); N-(cyanoethyl)ethylenimine (1-cyanoethyl aziridine); N-phenyl ethylenimine (1-phenyl aziridine); N-tolyl ethylenimine (1-(2-methylphenyl)aziridine); and N-(p-chlorophenyl)ethylenimine (1-(4-chlorophenyl)aziridine), as well as mixtures thereof.

In certain embodiments, the reaction with the imine takes place upon admixing the imine and the acid functional acrylic polymer and heating to moderate temperatures, such as 50° C. to 160° C., although higher or lower temperatures can be used, depending upon the desired reaction time. In certain embodiments, provided that at least some imine-modification is attained, improved properties can be achieved when all or part of the carboxyl groups present are reacted with the imine, the extent of reaction being based upon the amount of imine employed. In certain embodiments, it is only necessary that at least 0.1 percent by weight of acidic units, based upon the total methacrylate polymer or polymers, be reacted with imine.

In certain embodiments, the coating compositions of the present invention comprises any of the adjuvant acrylic polymers previously described wherein the polymer comprises an oligomeric macromonomer and a core from which the oligomeric macromonomer extends, wherein the oligomeric macromonomer comprises reactive functional groups and has an average functionality ranging from 1.0 to 30.0, and wherein the core is <10 weight % of the total polymer weight. Such polymers, as well as methods for their production, are described in U.S. patent application Ser. No. 12/040,371, filed Feb. 29, 2008, which is incorporated herein by reference.

In certain embodiments, the adjuvant polymer is present in the coating composition in an amount of at least 10 percent by weight, such as at least 15 percent by weight, or, in some cases, at least 20 percent by weight, based on the total weight of resin solids in the coating composition. In certain embodiments, the adjuvant polymer is present in the coating composition in an amount of no more than 50 percent by weight, such as no more than 40 percent by weight, or, in some cases, no more than 30 percent by weight, based on the total weight of resin solids in the coating composition.

As previously indicated, certain embodiments of the coating compositions of the present invention comprise a curing agent having functional groups reactive with the functional groups of the adjuvant polymer. Curing agents suitable for crosslinking hydroxyl and/or carboxylic functional group-containing materials include aminoplast resins. Aminoplast resins are based on the condensation products of aldehydes, with an amino or amido-group carrying substance. Condensation products obtained from the reaction of alcohols and formaldehyde with melamine, urea or benzoguanamine are common. While the aldehyde employed is most often formaldehyde, other similar condensation products can be made from other aldehydes, such as acetaldehyde, crotonaldehyde, acrolein, benzaldehyde, furfural, glyoxal and the like. The aminoplast resins often contain methylol or other alkylol groups, and in many instances at least a portion of these alkylol groups are etherified by a reaction with an alcohol to provide organic solvent soluble resins. Commonly employed aminoplast resins are substantially alkylated with methanol or butanol. Suitable aminoplast resins include those available under the tradename CYMEL® from Cytec Industries, Inc., under the tradename RESIMENE® from Solutia, Inc., and under the tradename LUWIPAL® from BASF.

Other useful curing agents include polyisocyanates which are useful for crosslinking hydroxyl and/or amine functional group-containing materials. Examples of suitable diisocyanates which can be utilized herein include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures, that is, at temperatures ranging from 80 to 200° C. Suitable blocking agents can include lower aliphatic alcohols such as methanol, oximes such as methyl ethyl ketoxime and lactams such as caprolactam.

Certain embodiments of the coating compositions of the present invention include one or more cure catalysts for catalyzing the reaction between the reactive functional groups of the curing agent and the reactive functional groups of the adjuvant polymer. In certain embodiments, the cure catalyst comprises an acid catalyst. The acid catalysts which are often employed when practicing this invention are sulfonic acid catalysts. Examples of suitable sulfonic acid catalysts include, without limitation: p-toluene sulfonic acid, naphthalene sulfonic acid derivatives, alkylbenzene sulfonic acid derivatives, alkyl sulfonic acids and the like, and/or combinations thereof.

In certain embodiments of the present invention, however, the acid catalyst is a polymeric isocyanate modified epoxy blocked sulfonic acid ester. In certain embodiments, such an isocyanate modified blocked sulfonic acid ester catalyst has the following structural formula:

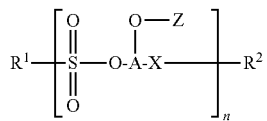

wherein:

Z is H or an isocyanate derived moiety of the following structure:

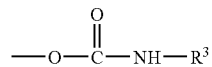

$R^1$ is monovalent or divalent $C_{1-18}$ alkyl, $C_{1-18}$ alkylene, or $C_{1-18}$ mono- or di-alkyl substituted phenyl or naphthyl, optionally substituted with 1 to 2 sulfonic acid groups;

R is H, mono or polyvalent $C_{1-18}$ alkyl, bisphenol A or bisphenol F, optionally substituted with a glycidyl or glycidyl derived moiety, such as

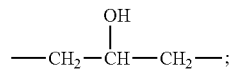

$R^3$ is $C_{1-18}$ alkyl, alkenyl, cycloalkyl, aryl or a polymeric moiety, optionally containing an ester, an ether or isocyanate functional or isocyanate derived group;

A is a multivalent linking group moiety derived from the ring opening reaction of an epoxy group with the following structure:

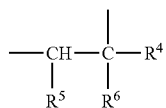

wherein $R^4$ is H or $-CH_2-$; $R^5$ and $R^6$ may be the same or different and each of $R^5$ and $R^6$ is H, $C_1$-$C_{12}$ alkyl or $R^4$ and $R^5$ together form a $C_6$-$C_{12}$ cycloalkyl;

n is 1-10 wherein if n is greater than 1, at least one of $R^1$, $R^2$ or $R^3$ is at least difunctional;

X is optional, and may be carboxy or oxy; and the molecular weight of the catalyst is at least about 1000.

Such catalysts, and methods for their production, are more fully described in U.S. Pat. No. 5,102,961, which is incorporated herein by reference. One example of such a catalyst, which is commercially available, is NACURE® 5414, supplied by King Industries, Norwalk, Conn.

It has been surprisingly discovered that use of the above-described polymeric isocyanate modified epoxy blocked sulfonic acid ester catalyst can result in fluoropolymer dispersions that exhibit significantly more favorable rheology properties as defined by a thixotropy index (as described earlier) in comparison to such dispersion in which another cure catalyst is used. As a result, the present invention is also directed to coating compositions comprising: (1) a fluorocarbon polymer; (2) an organic solvent; (3) a thermosetting adjuvant polymer comprising reactive functional groups; (4) a curing agent having functional groups reactive with the functional groups of the adjuvant polymer; (5) a cure catalyst comprising a polymeric isocyanate modified epoxy blocked sulfonic acid ester; and (6) a base neutralized acidic flatting agent.

In certain embodiments, the acid catalyst is present in an amount ranging from between 0.1 to 15.0 weight percent, such as from between 0.2 to 10.0 weight percent, or, in some cases, from between 0.2 to 1.0 weight percent, based upon the total weight of the resin solids in the coating composition.

In certain embodiments, the coating compositions of the present invention comprise a "hyperdispersant", such as those described in U.S. Pat. No. 6,017,639 at col. 6, lines 6-65, the cited portion of which being incorporated herein by reference. More particularly, in certain embodiments of the present invention, such a hyperdispersant comprises a fluorinated anionic dispersant, such as a salt of a fluorinated alkyl phosphate partial ester, a fluorinated alkylsulfonic acid salt, and/or a fluorinated alkylcarboxylic acid salt. In certain embodiments, such a hyperdispersant is present in the coating compositions of the present invention in an amount of 0.005 to 5.0 percent by weight, such as 0.01 to 3.0 percent by weight, or, in some cases, 0.1 to 1.0 percent by weight, based on the total weight of resin solids in the coating composition.

In other embodiments, however, the coating compositions of the present invention are substantially free or, in some cases, completely free, of any hyperdispersant. As used herein, the term "substantially free" when used with reference to the substantial absence of hyperdispersant in the coating compositions of the present invention, means that any such hyperdispersant, if present at all, is present in the coating composition in an amount of less than 0.005 percent by weight, based on the total weight of resin solids in the coating composition.

In certain embodiments, the coating compositions of the present invention also comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, nickel antimony titanate, chrome oxide, red iron oxide yellow iron oxide, orange iron oxide, and transparent iron oxides, and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle.

Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the coating compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, which is incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the coating compositions of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in United States Published Patent Application No. 2006-0014099 A1, which is incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

In certain embodiments, the coating compositions of the present invention have a solids content (resin solids plus pigment solids) ranging from 20 to 80 weight percent, such as 50 to 80 weight percent, and, in some cases, from 60 to 70 weight percent based on total weight of the composition.

Also suitable for use in the present invention are corrosion-inhibitive pigment types, such as chromates, silicas, silicates, phosphates, and molybdates, as well as those described in United States Patent Application Publication No. 2008-0022886A1 at [0020] to [0083] and [0108] to [0109], the cited portions of which being incorporated herein by reference. Extender or filler pigments suitable for use in the present invention include kaolin, talc, calcium carbonate, diatomaceous earth, synthetic calcium silicates, perlite, cellulose fibers, ground silica, calcined clays, microspheres, fumed silica, treated fumed silicas, titanium dioxide, wet ground micas, synthetic fibers, snobrite clay, bentonite clay, micronized micas, attapulgite clays, and alumina trihydrate.

As indicated, certain embodiments of the present invention are directed to coating compositions suitable for producing low gloss coatings. As used herein, the term "gloss" refers to the ability of a coating to reflect light, with a higher gloss value corresponding to a larger amount of light being reflected. As will be understood by those skilled in the art, gloss measurements can be made using a BYK Haze Gloss meter available from Gardner Instrument Company, Inc. As used herein, the term "60° gloss" refers to the gloss of a coated substrate determined at a 60° angle using such a BYK/Haze Gloss meter. As used herein, the term "low gloss coating" refers to a coating having a 60° gloss, measured as described above, of no more than 20 gloss units, in some cases no more than 10 gloss units, or, in yet other cases, no more than 5 gloss units. In certain embodiments, such coating compositions of the present invention are capable of producing a low gloss coating when applied at a film thicknesses of up to 20 mils.

To achieve coating compositions suitable for producing a low gloss coating, certain embodiments of the coating compositions of the present invention comprise a flatting agent. As used herein, the term "flatting agent" refers to a material, such as a pigment, added to a coating composition to reduce the gloss of a coating film deposited from such a composition. In some cases, as will be understood by those skilled in the art, it is the addition of a flatting agent to a coating composition that results in a coating composition capable of producing a low gloss coating.

Flatting agents may comprise inorganic or organic materials, both or either of which are suitable for use in the coating compositions of the present invention. Examples of inorganic flatting agents that are suitable for use in the coating compositions of the present invention include amorphous or pyrogenic silica, silica gels, alumina, titania, zirconia, zircon, tin oxide, magnesia, or mixtures thereof. An inorganic flatting agent may be untreated, or surface-treated with organic compounds, e.g., with suitable wax types or with inorganic compounds. Examples of organic flatting agents that are suitable for use in the coating compositions of the present invention include polypropylene, polyethylene, polytetrafluoroethylene (PTFE), and other polymers having equivalent or similar optical properties. Examples of other suitable organic flatting agents are Al, Zn, Ca or Mg stearate, waxy compounds such as, e.g., micronised polypropylene waxes, and urea-formaldehyde condensates.

In certain embodiments, however, the coating compositions of the present invention comprise an acidic flatting agent, such as amorphous silica gel, amorphous or pyrogenic silica, silica gels, and precipitated silica. As will be appreciated, silica particles have surfaces that are acidic in nature. As a result, such flatting agents are referred to a "acidic flatting agents" herein.

In certain embodiments, the coating compositions of the present invention comprise an acidic flatting agent that is base neutralized. As used herein, by "base neutralized", when used with referenced to the flatting agent, means that at least a portion of the acid functional groups on the acidic flatting agent particles have been neutralized with a base to form a carboxylate salt group. In certain embodiments, the degree of neutralization is at least 0.2, such as 0.2 to 2.0, in some cases from 0.5 to 1.5, such as 0.8 to 1.2, of the total theoretical neutralization equivalent. Suitable neutralizing agents include inorganic and organic bases, such as those described earlier with referenced to the base neutralized acid functional acrylic polymer.

In certain embodiments, the base neutralized acidic flatting agent is present in the coating compositions of the present invention in an amount of 1 up to 50 volume percent, such as 5 up to 30 volume percent or, in some cases, 10 up to 20 volume percent, with volume percent being based on the total volume of solids in the liquid coating composition.

It has been surprisingly discovered that base neutralization of an acidic flatting agent can, in at least some cases, provide for improved fluorocarbon dispersions and pigment dispersions, even at the relatively high acidic flatting agent loadings and at the high fluorocarbon resin loadings contemplated by certain embodiments of the present invention, as compared to such dispersions that include an acidic flatting agent that is not base neutralized. These dispersions can exhibit a thixotropy index (defined above) of no more than 10, in some cases no more than 8, whereas the thixotropy index of an identical dispersion containing an acidic flatting agent that is not base neutralized exhibits a thixotropy index that is far higher, in some cases over 30.

Other types of art recognized additives may be employed to control rheology, pigment dispersion, and settling, as well as flow or leveling. Occasionally, it may be advantageous to include UV absorbers and stabilizers for some pigmentations. Particularly useful UV stabilizers include those sold under the trade name TINUVIN by Ciba Specialty Chemicals, Basel, Switzerland.

The Examples herein demonstrate suitable methods for making the coating compositions of the present invention.

The coating compositions of the present invention are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semichrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co) polymers of (meth) acrylic acid compounds or melamine, dicyanodiamide and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

The coating compositions of the present invention can be applied to such substrates by any of a variety of methods including spraying, brushing, dipping, and roll coating, among other methods. In certain embodiments, however, the present coating compositions are particularly suited to be applied to a metal coil by roll coating. As a result, the present invention is also directed to a method of coil coating a metal substrate and the coil coated substrate. In the present coil coating method, a coil coating apparatus is used to apply a coating composition of the present invention. The coating composition is often applied such that the wet film thickness is 1 to 10 mils. The coating is then cured at, for example, a temperature of from 200° C. to 300° C. for 10 to 50 seconds to form a cured dry film with a film thickness of, for example, 0.5 to 6 mils.

The present invention is further directed to a method of spray coating a substrate and the spray coated substrate. In the present spray coating method, a spray coating apparatus is used to apply a coating composition of the present invention. The coating composition is often applied such that the wet film thickness is 1 to 4 mils. The coating is cured at, for example, a temperature of 200° C. to 300° C. for 5 to 20 minutes to form a cured dry film with a film thickness of, for example, 0.3 to 2 mils.

Another embodiment of the present invention is directed to a method of extrusion coating a substrate and the extrusion coated substrate. In the present extrusion coating method, an extrusion coating apparatus is used to apply a coating composition of the present invention. The coating composition is often applied such that the wet film thickness is 1 to 6 mils. The coating is cured at, for example, a temperature of 200° C. to 500° C. for 10 seconds to 20 minutes to form a cured dry film with a film thickness of, for example, 0.3 to 4 mils.

The present invention is also directed to multi-layer composite coatings. The multi-layer composite coating compositions of the present invention comprise a base-coat film-forming composition serving as a basecoat (often a pigmented color coat) and a film-forming composition applied over the basecoat serving as a topcoat (often a transparent or clear coat). At least one of the basecoat film-forming composition and the topcoat film-forming composition is deposited from a coating composition of the present invention. In certain embodiments, the basecoat is deposited from a coating composition of the present invention and, in certain embodiments, the topcoat, such as a transparent or clear coat, is deposited from a coating composition, the same as or different from a coating composition of the present invention, that comprises a fluorocarbon polymer.

Particular end uses where coated substrates of the present invention may be found include, but are not limited to, building panels, roofing panels, automotive body parts and aluminum extrusions.

Illustrating the invention are the following examples that are not to be considered as limiting the invention to their details. All parts and percentages in the examples, as well as throughout the specification, are by weight unless otherwise indicated.

EXAMPLE 1

This example describes the preparation of a base neutralized acid functional acrylic polymer. The polymer was prepared using the charges in Table 1.

TABLE 1

| Charge | Material Name | Weight (grams) |
|---|---|---|
| 1 | PM Acetate[1] | 1195 |
| 2 | Methyl Methacrylate | 2568.3 |
|  | Ethyl Acrylate | 1105.14 |
|  | Methacrylic Acid | 98.62 |
|  | Hydroxyethyl Acrylate | 205.94 |
| 3 | PM Acetate | 424 |
|  | Trigonox ® 131[2] | 93.23 |
| 4 | PM Acetate | 574.49 |
| 5 | PM Acetate | 424.8 |
|  | Trigonox ® 131 | 31.08 |
| 6 | PM Acetate | 960.68 |
| 7 | PM Acetate | 402.11 |
| 8 | Tinuvin ® 123[3] | 41.44 |
| 9 | Dimethylethanolamine | 112.37 |

[1]Propyleneglycol monomethyl ether acetate.
[2]tert-Amylperoxy 2-ethylhexyl carbonate from Akzo Nobel.
[3]Hindered amine light stabilizers (HALS) commercially available from Ciba.

Charge 1 was added to a flask equipped with mechanical stirring, thermocouple, reflux condenser, nitrogen inlet, and two feed lines for Charges 2 and 3 and heated to reflux under a nitrogen blanket. Charge 3 was added over 185 minutes and five minutes after charge 3 had begun, charge 2 was added over 180 minutes while maintaining mild reflux condition. Upon completion of charges 2 and 3, charge 4 was added as a rinse for charge 2. Reflux was regained and charge 5 was added over 1 hour while maintaining reflux. Upon completion of charge 5, charge 6 was added as a rinse for charge 5. The solution was then maintained at reflux for an additional 1 hour after the feed was completed. The solution was then cooled to below 40° C. prior to adding charge 8. Charge 8 was then added and the solution held for 15 minutes prior to adding charge 9 and then charge 7. The resulting solution was then poured through a suitable filter bag.

The resulting solution had a total solids content of 50.6% at 110° C., a Gardner viscosity of W+, a weight average molecular weight (Mw) of 14,663, and a polydispersity index (Mw/Mn) of 3.6.

EXAMPLE 2

This example describes the preparation of an acid functional acrylic polymer. The polymer was prepared using the charges in Table 2.

TABLE 2

| Charge | Material Name | Weight (grams) |
|---|---|---|
| 1 | PM Acetate | 1195 |
| 2 | Methyl Methacrylate | 2568.3 |
|  | Ethyl Acrylate | 1105.14 |
|  | Methacrylic Acid | 98.62 |
|  | Hydroxyethyl Acrylate | 205.94 |
| 3 | PM Acetate | 424 |
|  | Trigonox ® 131 | 93.23 |
| 4 | PM Acetate | 574.49 |
| 5 | PM Acetate | 424.8 |
|  | Trigonox ® 131 | 31.08 |
| 6 | PM Acetate | 960.68 |
| 7 | PM Acetate | 402.11 |
| 8 | Tinuvin ® 123 | 41.44 |

Charge 1 was added to a flask equipped with mechanical stirring, thermocouple, reflux condenser, nitrogen inlet, and two feed lines for Charges 2 and 3 and heated to reflux under a nitrogen blanket. Charge 3 was added over 185 minutes and five minutes after charge 3 had begun, charge 2 was added over 180 minutes while maintaining mild reflux condition.

Upon completion of charges 2 and 3, charge 4 was added as a rinse for charge 2. Reflux was regained and charge 5 was added over 1 hour while maintaining reflux. Upon completion of charge 5, charge 6 was added as a rinse for charge 5. The solution was then maintained at reflux for an additional 1 hour after the feed was completed. The solution was then cooled to below 40° C. prior to adding charge 8. Charge 8 was then added and the solution held for 15 minutes prior to adding charge 7. The resulting solution was then poured through a suitable filter bag.

The resulting solution had a total solids content of 52.28% at 110° C., a Gardner viscosity of X-Y, a weight average molecular weight (Mw) of 14,902, and a polydispersity index (Mw/Mn) of 3.9.

EXAMPLE 3

This example describes the preparation of an acrylic polymer comprising imine-reacted acidic groups. The polymer was prepared using the charges in Table 3.

TABLE 3

| Charge | Material Name | Weight (grams) |
|---|---|---|
| 1 | PM Acetate | 478.07 |
| 2 | Methyl Methacrylate | 1027.32 |
|   | Ethyl Acrylate | 442.06 |
|   | Methacrylic Acid | 39.45 |
|   | Hydroxyethyl Acrylate | 82.38 |
| 3 | PM Acetate | 169.6 |
|   | Trigonox ® 131 | 37.29 |
| 4 | PM Acetate | 229.80 |
| 5 | PM Acetate | 169.9 |
|   | Trigonox ® 131 | 12.43 |
| 6 | PM Acetate | 414.05 |
| 7 | Propylene imine | 13.10 |
| 8 | Tinuvin ® 123 | 16.58 |

Charge 1 was added to a flask equipped with mechanical stirring, thermocouple, reflux condenser, nitrogen inlet, and two feed lines for Charges 2 and 3 and heated to reflux under a nitrogen blanket. Charge 3 was added over 185 minutes and five minutes after charge 3 had begun, charge 2 was added over 180 minutes while maintaining mild reflux condition. Upon completion of charges 2 and 3, charge 4 was added as a rinse for charge 2. Reflux was regained and charge 5 was added over 1 hour while maintaining reflux. Upon completion of charge 5, charge 6 was added as a rinse for charge 5. The solution was then maintained at reflux for an additional 1 hour after the feed was completed. The solution was then cooled to 55-60° C. prior to adding charge 7. Charge 7 was then added using a syringe and the solution held for 1 hour at 57-60° C. The solution was then cooled to 37-40° C. and then charge 8 was added. The resulting solution was then poured through a suitable filter bag.

The resulting solution had a total solids content of 52.3% at 110° C., a Gardner viscosity of Z-Z1, a weight average molecular weight (Mw) of 12,195, and a polydispersity index (Mw/Mn) of 4.0.

EXAMPLE 4

This example describes the preparation of an acrylic polymer without acid groups. The polymer was prepared using the charges in Table 4.

TABLE 4

| Charge | Material Name | Weight (grams) |
|---|---|---|
| 1 | PM Acetate | 509.6 |
| 2 | Methyl Methacrylate | 1113.84 |
|   | Ethyl Acrylate | 394.15 |
|   | Hydroxyethyl Acrylate | 83.21 |
| 3 | PM Acetate | 191.1 |
|   | Trigonox ® 131 | 37.29 |
| 4 | PM Acetate | 229.8 |
| 5 | PM Acetate | 191.1 |
|   | Trigonox ® 131 | 12.43 |
| 6 | PM Acetate | 470.9 |
| 7 | Tinuvin ® 123 | 16.58 |

Charge 1 was added to a flask equipped with mechanical stirring, thermocouple, reflux condenser, nitrogen inlet, and two feed lines for Charges 2 and 3 and heated to reflux under a nitrogen blanket. Charge 3 was added over 185 minutes and five minutes after charge 3 had begun, charge 2 was added over 180 minutes while maintaining mild reflux condition. Upon completion of charges 2 and 3, charge 4 was added as a rinse for charge 2. Reflux was regained and charge 5 was added over 1 hour while maintaining reflux. Upon completion of charge 5, charge 6 was added as a rinse for charge 5. The solution was then maintained at reflux for an additional 1 hour after the feed was completed. The solution was then cooled to below 40° C. prior to adding charge 7. Charge 7 was then added and the solution held for 15 minutes. The resulting solution was then poured through a suitable filter bag.

The resulting solution had a total solids content of 50.68% at 110° C., a Gardner viscosity of V+, a weight average molecular weight (Mw) of 12,907, and a polydispersity index (Mw/Mn) of 3.6.

EXAMPLE 5

This example describes the preparation of an acrylic polymer without acid groups. The polymer was prepared using the charges in Table 5.

TABLE 5

| Charge | Material Name | Weight (grams) |
|---|---|---|
| 1 | PM Acetate | 478.07 |
| 2 | Methyl Methacrylate | 1065.44 |
|   | Ethyl Acrylate | 373.27 |
|   | Hydroxyethyl Acrylate | 135.92 |
| 3 | PM Acetate | 169.6 |
|   | Trigonox ® 131 | 49.73 |
| 4 | PM Acetate | 229.8 |
| 5 | PM Acetate | 169.9 |
|   | Trigonox ® 131 | 16.58 |
| 6 | PM Acetate | 545.11 |
| 7 | Tinuvin ® 123 | 16.58 |

Charge 1 was added to a flask equipped with mechanical stirring, thermocouple, reflux condenser, nitrogen inlet, and two feed lines for Charges 2 and 3 and heated to reflux under a nitrogen blanket. Charge 3 was added over 185 minutes and five minutes after charge 3 had begun, charge 2 was added over 180 minutes while maintaining mild reflux condition. Upon completion of charges 2 and 3, charge 4 was added as a rinse for charge 2. Reflux was regained and charge 5 was added over 1 hour while maintaining reflux. Upon completion of charge 5, charge 6 was added as a rinse for charge 5. The solution was then maintained at reflux for an additional 1 hour after the feed was completed. The solution was then cooled to below 40° C. prior to adding charge 7. Charge 7 was then added and the solution held for 15 minutes. The resulting solution was then poured through a suitable filter bag.

The resulting solution had a total solids content of 51.69% at 110° C., a Gardner viscosity of V+, a weight average molecular weight (Mw) of 13,520, and a polydispersity index (Mw/Mn) of 3.5.

EXAMPLE 6

This example describes the preparation of a base neutralized acid functional acrylic polymer. The polymer was prepared using the charges in Table 6.

TABLE 6

| Charge | Material Name | Weight (grams) |
| --- | --- | --- |
| 1 | PM Acetate | 478.07 |
| 2 | Methyl Methacrylate | 1015.72 |
|   | Ethyl Acrylate | 437.08 |
|   | Methacrylic Acid | 39.45 |
|   | Hydroxyethyl Acrylate | 82.38 |
| 3 | PM Acetate | 169.6 |
|   | Luperox ® 575[4] | 49.73 |
| 4 | PM Acetate | 229.8 |
| 5 | PM Acetate | 169.9 |
|   | Luperox ® 575 | 16.58 |
| 6 | PM Acetate | 495.75 |
| 7 | PM Acetate | 49.37 |
| 8 | Tinuvin ® 123[3] | 16.58 |
| 9 | Dimethylethanolamine | 44.95 |

[4]t-Amyl peroxy(2-ethylhexanoate) from Arkema Inc.

Charge 1 was added to a flask equipped with mechanical stirring, thermocouple, reflux condenser, nitrogen inlet, and two feed lines for Charges 2 and 3 and heated to reflux under a nitrogen blanket. Charge 3 was added over 185 minutes and five minutes after charge 3 had begun, charge 2 was added over 180 minutes while maintaining mild reflux condition. Upon completion of charges 2 and 3, charge 4 was added as a rinse for charge 2. Reflux was regained and charge 5 was added over 1 hour while maintaining reflux. Upon completion of charge 5, charge 6 was added as a rinse for charge 5. The solution was then maintained at reflux for an additional 1 hour after the feed was completed. The solution was then cooled to below 40° C. prior to adding charge 8. Charge 8 was then added and the solution held for 15 minutes prior to adding charge 9 and then charge 7. The resulting solution was then poured through a suitable filter bag.

The resulting solution had a total solids content of 51.62% at 110° C., a Gardner viscosity of X-Y, a weight average molecular weight (Mw) of 14,690, and a polydispersity index (Mw/Mn) of 3.8.

EXAMPLE 7

This example describes the preparation of a fluorocarbon polymer dispersion.

In a stainless steel beaker equipped with a Cowles blade disperser, 124.23 grams of the product of Example 1 and 309.5 grams of isophorone was charged. 592.2 grams of KYNAR® 500 RC 10219 (Polyvinylidenedifluoride polymer from Atofina) was then added followed by 33.2 grams of isophorone. The dispersion was mixed until a Hegman grind reading of 5-6 was achieved for the slurry. 2.63 grams of CYASTAT® SN (antistatic agent commercially available from Cytec) was then added and mixed for 5 minutes. 5.38 grams of ZONYL® FSP (anionic phosphate fluorosurfactant commercially available from DuPont) was then added and mixed for 10 minutes.

EXAMPLE 8

This example describes the preparation of a fluorocarbon polymer dispersion.

In a stainless steel beaker equipped with a Cowles blade disperser, 75.44 grams of the product of Example 2 and 207.52 grams of isophorone was charged. 373.14 grams of KYNAR® 500 RC 10219 was then added followed by 11.2 grams of isophorone. The dispersion was mixed until a Hegman grind reading of 5-6 was achieved for the slurry. 1.66 grams of CYASTAT® SN was then added and mixed for 5 minutes. 3.39 grams of ZONYL® FSP was then added and mixed for 10 minutes.

EXAMPLE 9

This example describes the preparation of a fluorocarbon polymer dispersion.

In a stainless steel beaker equipped with a Cowles blade disperser, 75.41 grams of the product of Example 3 and 208.8 grams of isophorone was charged. 373.14 grams of KYNAR® 500 RC 10219 was then added followed by 11.2 grams of isophorone. The dispersion was mixed until a Hegman grind reading of 5-6 was achieved for the slurry. 1.66 grams of CYASTAT® SN was then added and mixed for 5 minutes. 3.39 grams of ZONYL® FSP was then added and mixed for 10 minutes.

EXAMPLE 10

This example describes the preparation of a fluorocarbon polymer dispersion.

In a stainless steel beaker equipped with a Cowles blade disperser, 77.88 grams of the product of Example 4 and 204.9 grams of isophorone was charged. 373.42 grams of KYNAR® 500 RC 10219 was then added followed by 11.62 grams of isophorone. The dispersion was mixed until a Hegman grind reading of 5-6 was achieved for the slurry. 1.66 grams of CYASTAT® SN was then added and mixed for 5 minutes. 3.39 grams of ZONYL® FSP was then added and mixed for 10 minutes.

EXAMPLE 11

This example describes the preparation of a fluorocarbon polymer dispersion.

In a stainless steel beaker equipped with a Cowles blade disperser, 75.41 grams of the product of Example 3, 0.54 grams of dimethylethanolamine, and 208.2 grams of isophorone was charged. 373.14 grams of KYNAR® 500 RC 10219 was then added followed by 11.20 grams of isophorone. The dispersion was mixed until a Hegman grind reading of 5-6 was achieved for the slurry. 1.66 grams of CYASTAT® SN was then added and mixed for 5 minutes. 3.39 grams of ZONYL® FSP was then added and mixed for 10 minutes.

EXAMPLE 12

This example describes the preparation of a white pigment dispersion.

In a stainless steel beaker equipped with a Cowles blade disperser and a water cooling bath, 251.1 grams of the product of Example 1, 251.9 grams of isophorone, and 19.8 grams SUSPENO 201-X (rheology additive from Poly-Resyn, Inc.) were charged. 1124.7 grams of TIONA® 696 (titanium dioxide commercially available from Millenium) was then added slowly and then mixed for 10 minutes. The mixing blade was then changed from a Cowles blade to a flat disc zircoa milling blade and 990 grams zircoa beads (1.2-1.7 mm) were added and the contents mixed at high speed until a Hegman grind reading of 7.5+ was achieved. 12.9 grams of isophorone was then added and the dispersion was mixed for 10 minutes at low speed. The zircoa beads were then filtered out and the dispersion filled into a quart can.

EXAMPLE 13

This example describes the preparation of a white pigment dispersion.

In a stainless steel beaker equipped with a Cowles blade disperser and a water cooling bath, 121 grams of the product of Example 2, 136.93 grams of isophorone, and 9.89 grams SUSPENO 201-X were charged. 562.36 grams of TIONA® 696 was then added slowly and then mixed for 10 minutes. The mixing blade was then changed from a Cowles blade to a flat disc zircoa milling blade and 990 grams zircoa beads (1.2-1.7 mm) were added and the contents mixed at high speed until a Hegman grind reading of 7.5+ was achieved. The zircoa beads were then filtered out and the dispersion filled into a quart can.

EXAMPLE 14

This example describes the preparation of a white pigment dispersion.

In a stainless steel beaker equipped with a Cowles blade disperser and a water cooling bath, 120.96 grams of the product of Example 3, 138.95 grams of isophorone, and 9.89 grams SUSPENO 201-X were charged. 562.36 grams of TIONA® 696 was then added slowly and then mixed for 10 minutes. The mixing blade was then changed from a Cowles blade to a flat disc zircoa milling blade and 990 grams zircoa beads (1.2-1.7 mm) were added and the contents mixed at high speed until a Hegman grind reading of 7.5+ was achieved. The zircoa beads were then filtered out and the dispersion filled into a quart can.

EXAMPLE 15

This example describes the preparation of a white pigment dispersion.

In a stainless steel beaker equipped with a Cowles blade disperser and a water cooling bath, 120.96 grams of the product of Example 3, 0.87 grams of dimethylethanolamine, 138.03 grams of isophorone, and 9.89 grams SUSPENO 201-X were charged. 562.36 grams of TIONA® 696 was then added slowly and then mixed for 10 minutes. The mixing blade was then changed from a Cowles blade to a flat disc zircoa milling blade and 990 grams zircoa beads (1.2-1.7 mm) were added and the contents mixed at high speed until a Hegman grind reading of 7.5+ was achieved. The zircoa beads were then filtered out and the dispersion filled into a quart can.

EXAMPLE 16

This example describes the preparation of a red pigment dispersion.

In a stainless steel beaker equipped with a Cowles blade disperser and a water cooling bath, 342.93 grams of the product of Example 1, 355.20 grams of isophorone, and 33.44 grams SUSPENO 201-X were charged. 1547.43 grams of R03097 Kroma Red Oxide (from Rockwood Pigments) was then added slowly and then mixed for 10 minutes. The dispersion was then processed through a 250mL Eiger mill, 70% charge, zircoa beads (1.2-1.7 mm) until a Hegman grind reading of 7.5+0 was achieved. The zircoa beads were then filtered out and the dispersion filled into a container.

EXAMPLE 17

This example describes the preparation of a fluoropolymer containing coating composition, white in color, having a volume solids content of 46.6%. To prepare the composition, the components of Table 7 were added to a suitable container under agitation.

TABLE 7

| Component | Material Name | Amount (grams) |
|---|---|---|
| 1 | Fluorocarbon Polymer Dispersion of Example 7 | 162.18 |
| 2 | White Pigment Dispersion of Example 12 | 84.59 |
| 3 | Product of Example 1 | 27.64 |
| 4 | LUWIPAL ® 066 LF[5] | 6.37 |
| 5 | NACURE ® 5414[6] | 0.58 |
| 6 | Isophorone | 6.2 |

[5]Hexamethoxymethyl melamine resin available from BASF.
[6]Polymeric isocyanate modified epoxy blocked dodecyl benzene sulfonic acid from King Industries, Norwalk, CT. Its preparation is believed to be best described in U.S. Pat. No. 5,102,961, Example 1. The catalyst requires a minimum of 130° C. cure temperature to deblock the blocking polymer.

EXAMPLE 18

This example describes the preparation of a fluoropolymer containing coating composition, white in color, having a volume solids content of 46.6%. To prepare the composition, the components of Table 8 were added to a suitable container under agitation.

TABLE 8

| Component | Material Name | Amount (grams) |
|---|---|---|
| 1 | Fluorocarbon Polymer Dispersion of Example 8 | 162.15 |
| 2 | White Pigment Dispersion of Example 13 | 84.59 |
| 3 | Product of Example 2 | 26.65 |
| 4 | LUWIPAL ® 066 LF | 6.37 |
| 5 | NACURE ® 5414 | 0.58 |
| 6 | Isophorone | 7.2 |

EXAMPLE 19

This example describes the preparation of a fluoropolymer containing coating composition, white in color, having a volume solids content of 46.6%. To prepare the composition, the components of Table 9 were added to a suitable container under agitation.

TABLE 9

| Component | Material Name | Amount (grams) |
|---|---|---|
| 1 | Fluorocarbon Polymer Dispersion of Example 9 | 162.47 |
| 2 | White Pigment Dispersion of Example 14 | 84.79 |
| 3 | Product of Example 3 | 26.63 |
| 4 | LUWIPAL ® 066 LF | 6.37 |
| 5 | NACURE ® 5414 | 0.58 |
| 6 | Isophorone | 7.66 |

EXAMPLE 20

This example describes the preparation of a fluoropolymer containing coating composition, white in color, having a volume solids content of 46.6%. To prepare the composition, the components of Table 10 were added to a suitable container under agitation.

TABLE 10

| Component | Material Name | Amount (grams) |
|---|---|---|
| 1 | Fluorocarbon Polymer Dispersion of Example 11 | 162.44 |
| 2 | White Pigment Dispersion of Example 15 | 84.79 |
| 3 | Product of Example 3 | 26.63 |
| 4 | Dimethylethanolamine | 0.19 |
| 5 | LUWIPAL ® 066 LF | 6.37 |
| 6 | NACURE ® 5414 | 0.58 |
| 7 | Isophorone | 7.45 |

EXAMPLE 21

This example describes the preparation of a fluoropolymer containing coating composition, white in color, having a volume solids content of 46.6%. To prepare the composition, the components of Table 11 were added to a suitable container under agitation.

TABLE 11

| Component | Material Name | Amount (grams) |
|---|---|---|
| 1 | Fluorocarbon Polymer Dispersion of Example 10 | 162.18 |
| 2 | White Pigment Dispersion of Example 12 | 84.59 |
| 3 | Product of Example 4 | 26.63 |
| 4 | LUWIPAL ® 066 LF | 6.37 |
| 5 | NACURE ® 5414 | 0.58 |
| 6 | Isophorone | 6.35 |

Rheology Testing

The coating compositions of Examples 17-21 were evaluated for rheology properties as defined by a thixotropy index, which is the viscosity of the dispersion in centipoise at 0.5 rpm divided by the viscosity of the dispersion in centipoise at 50 rpm, measured using a Brookfield cone and plate viscometer, 52 spindle, at 25° C. The thixotropy index was measured upon preparation of the composition (initial) and after 1 day at 105° F. Results are set forth in Table 12.

TABLE 12

| Example | Thixotropy Index Initial | Thixotropy Index after 1 day at 105° F. |
|---|---|---|
| 17 | 3.8 | 6.2 |
| 18 | 8.3 | 13.3 |
| 19 | 4.2 | 3.0 |
| 20 | 6.4 | 5.9 |
| 21 | 5.4 | 6.5 |

Application and Testing

The compositions of Examples 17-21 were applied with a wet film wire wound rod to B-1421 hot dipped galvanized steel. A primer, 1PLY5823, available commercially from PPG Industries, was applied with a dry film thickness of 0.2 mils. The coating compositions of Examples 17-21 were then applied with a peak metal temperature of 240° C. (465° F.) and a dwell time in the oven of 25 seconds. The film thickness was 0.8 mils for each example. Results are set forth in Table 13.

TABLE 13

| Example | 60° gloss | Double Rub MEK | Pencil Hardness | Flexibility T-Bend - No Pick | Flexibility T-Bend - No Crack |
|---|---|---|---|---|---|
| 17 | 48.9 | 100+ | F | 0 T | 2 T |
| 18 | 50.1 | 100+ | F | 0 T | 2 T |
| 19 | 42.2 | 100+ | F | 0 T | 2 T |
| 20 | 46.5 | 100+ | F | 0 T | 2 T |
| 21 | 49.2 | 100+ | F | 0 T | 2 T |

EXAMPLE 22

This example describes the preparation of a fluorocarbon polymer dispersion.

In a stainless steel beaker equipped with a Cowles blade disperser, 78.42 grams of the product of Example 5, 188 grams of isophorone, and 0.84 grams of CYASTAT® SN were charged. 380.05 grams of KYNAR® 500 (Polyvinylidenedifluoride polymer from Atofina) was then added slowly and the dispersion was mixed until a Hegman grind reading of 5-6 was achieved for the slurry.

EXAMPLE 23

This example describes the preparation of a green pigment dispersion.

In a stainless steel beaker equipped with a Cowles blade disperser and a water cooling bath, 363.33 grams of the product of Example 6, 250.80 grams of SANTOSOL® DME-1 (a mixture of dimethyl esters available from Solutia, Inc.), and 19.8 grams SUSPENO 201-NBA (rheology additive available from Poly-Resyn, Inc.) were charged. 878.21 grams of Sherwood Green #5 pigment (from Shepherd Pigments), 182.72 grams of Shepherd Blue 9U pigment (from Shepherd Pigments) and 182.72 grams of Shepherd Black 430 (from Shepherd Pigments) were then added slowly and then mixed for 10 minutes. The dispersion was then processed through a 250 mL Eiger mill, 70% charge, zircoa beads (1.2-1.7 mm) until a Hegman grind reading of 7.25+ was achieved. The zircoa beads were then filtered out and the dispersion filled into a container.

EXAMPLE 24

This example describes the preparation of various fluoropolymer containing coating composition, green in color. To prepare the compositions, the components of Table 14 were added to a suitable container under agitation.

TABLE 14

| Material | Ex. 24A | Ex. 24B | Ex. 24C | Ex. 24D | Ex. 24E | Ex. 24F | Ex. 24G | Ex. 24H |
|---|---|---|---|---|---|---|---|---|
| Product of Example 22 | 99.78 | 99.78 | 99.78 | 99.78 | 99.78 | 99.78 | 99.78 | 99.78 |
| Product of Example 23 | 50.17 | 50.17 | 50.17 | 50.17 | 50.17 | 50.17 | 50.17 | 50.17 |
| Flow additive | 0.84 | 0.84 | 0.84 | 0.84 | 0.84 | 0.84 | 0.84 | 0.84 |

TABLE 14-continued

| Material | Ex. 24A | Ex. 24B | Ex. 24C | Ex. 24D | Ex. 24E | Ex. 24F | Ex. 24G | Ex. 24H |
|---|---|---|---|---|---|---|---|---|
| DIAX 2770[7] | 0.67 | 0.67 | 0.67 | 0.67 | 0.67 | 0.67 | 0.67 | 0.67 |
| Product of Example 5 | 15.04 | 15.04 | 15.04 | 15.04 | 15.04 | 15.04 | 15.04 | 15.04 |
| LUWIPAL 066 LF | 4.19 | 4.19 | 4.19 | 4.19 | 4.19 | 4.19 | 4.19 | 4.19 |
| Isophorone | 4.31 | 4.31 | 4.31 | 4.31 | 4.31 | 4.31 | 4.31 | 4.31 |
| FASTCAT B25[8] | 0.34 | 0.67 | — | — | — | — | — | — |
| NACURE 1419[9] | — | — | 0.88 | 1.31 | — | — | — | — |
| NACURE 5225[10] | — | — | — | — | 1.04 | 1.58 | — | — |
| NACURE 5414 | — | — | — | — | — | — | 1 | 1.52 |

[7] A Polyalphaolefin prepared using 1-dodecene and having a molecular weight of about 1500 available from Baker Petrolite.
[8] Amine blocked p-toluene sulfonic acid catalyst from Nichem Corp.
[9] Epoxy blocked dinonyl napthalene sulphonic acid catalyst from King Industries.
[10] Amine-blocked dodecyl benzenesulfonic acid catalyst from King Industries.

Rheology Testing

The coating compositions of Example 24 were evaluated for rheology properties as defined by a thixotropy index, which is the viscosity of the dispersion in centipoise at 0.5 rpm divided by the viscosity of the dispersion in centipoise at 50 rpm, measured using a Brookfield cone and plate viscometer, 52 spindle, at 25° C. Results are set forth in Table 15.

TABLE 15

| Example | Thixotropy Index |
|---|---|
| 24A | 20.2 |
| 24B | 25.3 |
| 24C | 15.2 |
| 24D | 18.6 |
| 24E | 29 |
| 24F | 32.3 |
| 24G | 5.5 |
| 24H | 10.4 |

EXAMPLE 25

This example describes the preparation of a fluorocarbon polymer dispersion. In a stainless steel beaker equipped with a Cowles blade disperser, 124.23 grams of the product of Example 1, 8.29 grams of an acrylic flow additive, and 320.35 grams of isophorone were charged. 580.80 grams of KYNAR® 500 RC 10219 was then added followed by 22.16 grams of isophorone. The dispersion was mixed until a Hegman grind reading of 5-6 was achieved for the slurry. 2.58 grams of CYASTAT® SN was then added and mixed for 10 minutes.

EXAMPLE 26

This example describes the preparation of a flatting agent slurry. In a stainless steel beaker equipped with a Cowles blade disperser, 557.74 grams of the product of Example 1, 84.94 grams of LUWIPAL 066 LF, 2160.89 grams of the product of Example 25, and 1689.95 grams of isophorone solvent were added. With mixing, 725.67 grams of Sylysia 290, synthetically produced, amorphous, micronized silica from Fuji Sylysia Chemical LTD was slowly added. The mixture was then mixed on high speed for 15 minutes until a Hegman grind of 5.25+ was attained.

EXAMPLE 27

In a ½ pint can, the following composition was prepared and mixed: 54.04 grams of product of Example 25, 147.21 grams of product from Example 26, 73.22 grams of product from Example 12, 0.25 grams of product from Example 1, 2.11 grams of LUWIPAL 066 LF, 0.72 grams of DIAX 2770, 0.55 grams of NACURE 5414.

EXAMPLE 28

In a ½ pint can, the following composition was prepared and mixed: 54.04 grams of product of Example 25, 147.21 grams of product from Example 26, 73.22 grams of product from Example 12, 0.25 grams of product from Example 1, 2.11 grams of LUWIPAL 066 LF, 0.72 grams of DIAX 2770, 0.55 grams of NACURE 5414 and 0.28 grams Dibutylamine.

EXAMPLE 29

In a ½ pint can, the following composition was prepared and mixed: 128.37 grams of product of Example 25, 87.18 grams of product from Example 12, 17.36 grams of product from Example 1, 5.02 grams LUWIPAL 066LF, 0.81 grams of DIAX 2770, and 0.61 grams of Nacure 5414.

EXAMPLE 30

In a ½ pint can, the following composition was prepared and mixed: 128.37 grams of product of Example 25, 87.18 grams of product from Example 12, 17.36 grams of product from Example 1, 5.02 grams LUWIPAL 066LF, 0.81 grams of DIAX 2770, 0.61 grams of Nacure 5414 and 0.22 grams Dibutylamine.

Rheology Testing

The compositions of Examples 27, 28, 29 and 30 were evaluated for rheology properties as described in Example 24. Results are set forth in Table 16.

TABLE 16

| Example | Thixotropy Index |
|---|---|
| 27 | 31.96 |
| 28 | 7.86 |
| 29 | 4.87 |
| 30 | 4.93 |

Application and Testing

The compositions of Examples 27, 28, 29 and 30 were applied with a wet film wire wound rod to PT1500 treated aluminum primed with 0.25 mil PLY5823 primer commercially available from PPG Industries, Inc. The coating compositions of Examples 27, 28, 29 and 30 were applied with a peak metal temperature of 240° C. (465° F.) and a dwell time in the oven of 43 seconds. The film thickness was 0.75 mils for each example. Results are set forth in Table 17.

TABLE 17

| Example | 60° gloss | Double Rub MEK | Pencil Hardness | Flexibility T-Bend - No Pick | Flexibility T-Bend - No Crack | Drawbar Lines Present |
|---|---|---|---|---|---|---|
| 27 | 2.0 | 100+ | F | 3 T | 3 T | Yes |
| 28 | 2.0 | 100+ | F | 3 T | 3 T | No |
| 29 | 42  | 100+ | F | 1 T | 2 T | No |
| 30 | 42  | 100+ | F | 1 T | 2 T | No |

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A coating composition comprising:
   (1) a fluorocarbon polymer;
   (2) an organic solvent;
   (3) an adjuvant polymer comprising at least one of:
      (a) a base neutralized acid functional acrylic polymer; and
      (b) an acrylic polymer comprising imine-reacted acidic groups, and
   (4) a base neutralized acidic flatting agent,
   wherein the fluorocarbon polymer (1) is present as a dispersed phase and a solution comprising the organic solvent (2) and the adjuvant polymer (3) is present as a continuous phase.

2. The coating composition of claim 1, comprising up to 5 weight percent water, based on the total weight of the coating composition.

3. The coating composition of claim 1, wherein the fluorocarbon polymer is present in an amount of at least 70 percent by weight, based on the total weight of resin solids in the coating composition.

4. The coating composition of claim 1, wherein the adjuvant polymer comprises a thermosetting polymer comprising reactive functional groups.

5. The coating composition of claim 4, wherein the reactive functional groups comprise hydroxyl groups.

6. The coating composition of claim 1, wherein the acrylic polymer is derived from monomers comprising a carboxylic acid functional group-containing monomer that is present in an amount of 1 to 5 percent by weight, based on the total weight of the monomers used to prepare the acrylic polymer.

7. The coating composition of claim 6, wherein the acrylic polymer is derived from monomers comprising a carboxylic acid functional group-containing monomer that is present in an amount of more than 2 to 5 percent by weight, based on the total weight of the monomers used to prepare the acrylic polymer.

8. The coating composition of claim 4, wherein the adjuvant polymer comprises a thermosetting acrylic polymer having a weight average molecular weight ranging from 10,000 to 30,000.

9. The coating composition of claim 1, wherein the adjuvant polymer comprises the base neutralized acid functional acrylic polymer, wherein a degree of neutralization of the base neutralized acrylic polymer ranges from 0.5 to 1.5 of the total theoretical neutralization equivalent.

10. The coating composition of claim 1, wherein the adjuvant polymer comprises the acrylic polymer comprising imine-reacted acidic groups, wherein the imine-reacted acidic groups are derived from reacting the acidic units on an acid functional acrylic polymer with an imine having the general formula:

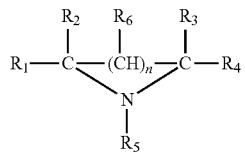

where:
(a) $R_1$, $R_2$, $R_3$, $R_4$ and $R_5$ are the same or different and are each either hydrogen, alkyl, aryl, alkaryl, or aralkyl;
(b) $R_6$ is hydrogen or a lower alkyl radical having not more than 6 carbon atoms; and
(c) n is 0 or 1.

11. The coating composition of claim 1, wherein the adjuvant polymer is present in an amount of at least 10 percent by weight, based on the total weight of resin solids in the coating composition.

12. The coating composition of claim 1, wherein the acidic flatting agent comprises silica particles.

13. The coating composition of claim 4, wherein the composition further comprises a curing agent having functional groups reactive with the functional groups of the adjuvant polymer.

14. The coating composition of claim 13, further comprising a cure catalyst comprising a polymeric isocyanate modified epoxy blocked sulfonic acid ester.

15. The coating composition of claim 14, wherein the isocyanate modified blocked sulfonic acid ester catalyst has the following structural formula:

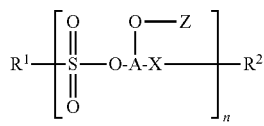

wherein:
Z is H or an isocyanate derived moiety of the following structure:

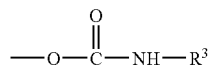

$R^1$ is monovalent or divalent $C_{1-18}$ alkyl, $C_{1-18}$ alkylene, or $C_{1-18}$ mono- or di-alkyl substituted phenyl or naphthyl, optionally substituted with 1 to 2 sulfonic acid groups;
$R^2$ is H, mono or polyvalent $C_{1-18}$ alkyl, bisphenol A or bisphenol F, optionally substituted with a glycidyl or glycidyl derived moiety;

$R^3$ is $C_{1-18}$ alkyl, alkenyl, cycloalkyl, aryl or a polymeric moiety, optionally containing an ester, an ether or isocyanate functional or isocyanate derived group;

A is a multivalent linking group moiety derived from the ring opening reaction of an epoxy group with the following structure:

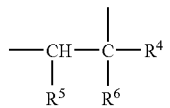

wherein $R^4$ is H or —$CH_2$—; $R^5$ and $R^6$ are the same or different and each of $R^5$ and $R^6$ is H, $C_1$-$C_{12}$ alkyl or $R^4$ and $R^5$ together form a $C_6$-$C_{12}$ cycloalkyl;

n is 1-10 wherein if n is greater than 1, at least one of $R^1$, $R^2$ or $R^3$ is at least difunctional;

X is optional, and is carboxy or oxy; and the molecular weight of the catalyst is at least about 1000.

* * * * *